(12) United States Patent
Zhu

(10) Patent No.: US 8,504,023 B2
(45) Date of Patent: Aug. 6, 2013

(54) METHOD AND SYSTEM FOR WIRELESS DATA FLOW

(75) Inventor: Ling Zhu, Su Zhou (CN)

(73) Assignee: Sernet (Suzhou) Technologies Corporation, Jiangsu (CN)

( * ) Notice: Subject to any disclaimer, the term of this patent is extended or adjusted under 35 U.S.C. 154(b) by 0 days.

(21) Appl. No.: 13/540,732

(22) Filed: Jul. 3, 2012

(65) Prior Publication Data

US 2013/0012157 A1    Jan. 10, 2013

(30) Foreign Application Priority Data

Jul. 5, 2011    (CN) .......................... 2011 1 0186193

(51) Int. Cl.
*H04W 4/00*    (2009.01)

(52) U.S. Cl.
USPC ..... 455/432.3; 455/405; 455/447; 455/426.2; 455/436; 455/437

(58) Field of Classification Search
USPC .................. 455/405, 432.3, 450, 447, 426.2, 455/436, 437; 370/329, 331
See application file for complete search history.

(56) References Cited

U.S. PATENT DOCUMENTS

| 2010/0272013 A1 | 10/2010 | Horn et al. | |
| 2011/0286410 A1* | 11/2011 | Zembutsu et al. | 370/329 |
| 2012/0300750 A1* | 11/2012 | Chin et al. | 370/331 |

FOREIGN PATENT DOCUMENTS

CN    101841886    9/2010

OTHER PUBLICATIONS

English language translation of abstract of CN 101841886 (published Sep. 22, 2010).

* cited by examiner

*Primary Examiner* — Manpreet Matharu
(74) *Attorney, Agent, or Firm* — McClure, Qualey & Rodack, LLP

(57) ABSTRACT

After receiving a packet data protocol (PDP) activation request signaling from a user equipment (UE), a base station checks whether to activate a local Internet protocol access (LIPA) function for the UE. If yes, the base station informs a core network (CN) for authentication and signaling control. If the user plane data from the UE is allowed to be transmitted via the LIPA, the base station assigns a private IP address to the UE; and the UE access internet via the base station. The base station determines whether user plane data from the UE passes through the CN; and the CN measures Internet service time provided to the UE. If all user plane data transmitted from the UE are allowed to be transmitted via the LIPA, the base station periodically transmits a data packet to the CN to maintain signaling link.

8 Claims, 3 Drawing Sheets

METHOD AND SYSTEM FOR WIRELESS DATA FLOW

This application claims the benefit of People's Republic of China application Serial No. 201110186193.0, filed Jul. 5, 2011, the subject matter of which is incorporated herein by reference.

BACKGROUND

1. Technical Field

The disclosure relates in general to a wireless telecommunication system and method, and more particularly to a method and a system for wireless data flow.

2. Description of the Related Art 3G mobile telecommunication system aims to provide users to access broadband wireless multimedia service anytime and anywhere. Universal mobile telecommunication system (UMTS) provides high quality audio service and high speed access bandwidth, supports multi-service quality mechanism, satisfies audio/data mixed real-time and non-real-time needs, enhances security mechanism, possesses multi-access service function (allowing the user to internet phone call and Internet service at the same time) and video telephony function.

In general, the UMTS network has three main parts, namely, a user equipment (UE), a UMTS terrestrial radio access network (UTRAN) and a core network (CN).

The UE, user's mobile terminal equipment, may refer to such as a 3G mobile phone via which the user may access internet or make a phone call.

The UTRAN, which makes the UE to access to the CN, includes radio network subsystems (RNS). The RNS includes a radio network controller (RNC) and plural base stations (or called Node B). The base station transmits/receives radio signals to/from one or plural mobile phones. The RNC controls use of radio resources.

The CN handles signaling exchange. The CN is interfaced with external network such as a public switched telephone network (PSTN), an integrated service digital network (ISDN), or Internet.

Currently, the base station, or a home node-B (HNB), provides 3G wireless coverage function to 3G mobile phones within home. The base station is connected to an existing home broadband service.

Along with continual development of 3G network application, internet data services is a big network load to the operators, and may even affect the audio quality. The network load of operators will be reduced if the internet data services may directly visit an external network via the HNB without passing through the CN.

Even the internet data services may directly visit an external network via the HNB directly without passing through the CN, the operators still hope that the CN keeps the function of signaling control, so that the time-measuring function is maintained (that is, the CN still measures the Internet service hours provided to the UE).

SUMMARY OF THE DISCLOSURE

The disclosure is directed to a method and a system for wireless data flow. When a user equipment (UE) sends a PDP activation request, signaling exchange is controlled by a core network (CN) but a user plane transmission goes through local Internet protocol access (LIPA). The CN controls signaling exchange and measures Internet service hours provided to the UE.

The disclosure is directed to a method and a system for wireless data flow. After the UE pass authentication by the CN, the UE accesses to internet directly via the base station. The base station determines whether the Internet data flow passes through the CN or not according to LIPA disposition.

The disclosure is directed to a method and a system for wireless data flow. If the base station determines that all data from the UE are allowed to be transmitted via the LIPA, the base station periodically transmits data packets to the CN to keep the CN activated and to prevent the signaling link from being disconnected.

According to one embodiment of the present disclosure, a method for wireless data flow is provided. After the user equipment (UE) transmits a PDP activation request signaling to the base station, the base station checks whether to activate a local Internet protocol access (LIPA) function for the UE. If the base station determines that the UE is allowed to activate the LIPA function, then the base station informs a core network (CN) to perform authentication and control signaling exchange. If the base station allows the user plane data transmitted from the UE to be transmitted via the LIPA, then the CN assigns a private IP address to the UE for allowing the UE to access internet via the base station. The base station determines whether a user plane data transmitted from the UE passes through the CN according to the LIPA disposition. The CN measures an Internet service time provided the UE. If the base station allows all user plane data transmitted from the UE to be transmitted via the LIPA, then the base station periodically transmits data packet to the CN to maintain the signaling link between the base station and the CN.

According to one embodiment of the present disclosure, a system for wireless data flow is provided. The system comprises a UE, a base station and a CN. After the UE transmits a PDP activation request signaling to the base station, the base station checks whether to activate a local Internet protocol access (LIPA) function for the UE. If the base station determines that the UE is allowed to activate the LIPA function, then the base station informs the CN to perform authentication and control signaling exchange. If the base station allows the user plane data from the UE to be transmitted via the LIPA, then the CN assigns a private IP address to the UE for allowing the UE to access internet via the base station. The base station determines whether a user plane data transmitted from the UE passes through the CN. The CN measures an Internet service time provided to the UE. If the base station allows all user plane data transmitted from the UE to be transmitted via the LIPA, then the base station periodically transmits data packet to the CN to maintain the signaling link between the base station and the CN.

The above and other contents of the disclosure will become better understood with regard to the following detailed description of the preferred but non-limiting embodiment(s). The following description is made with reference to the accompanying drawings.

Figure 1:
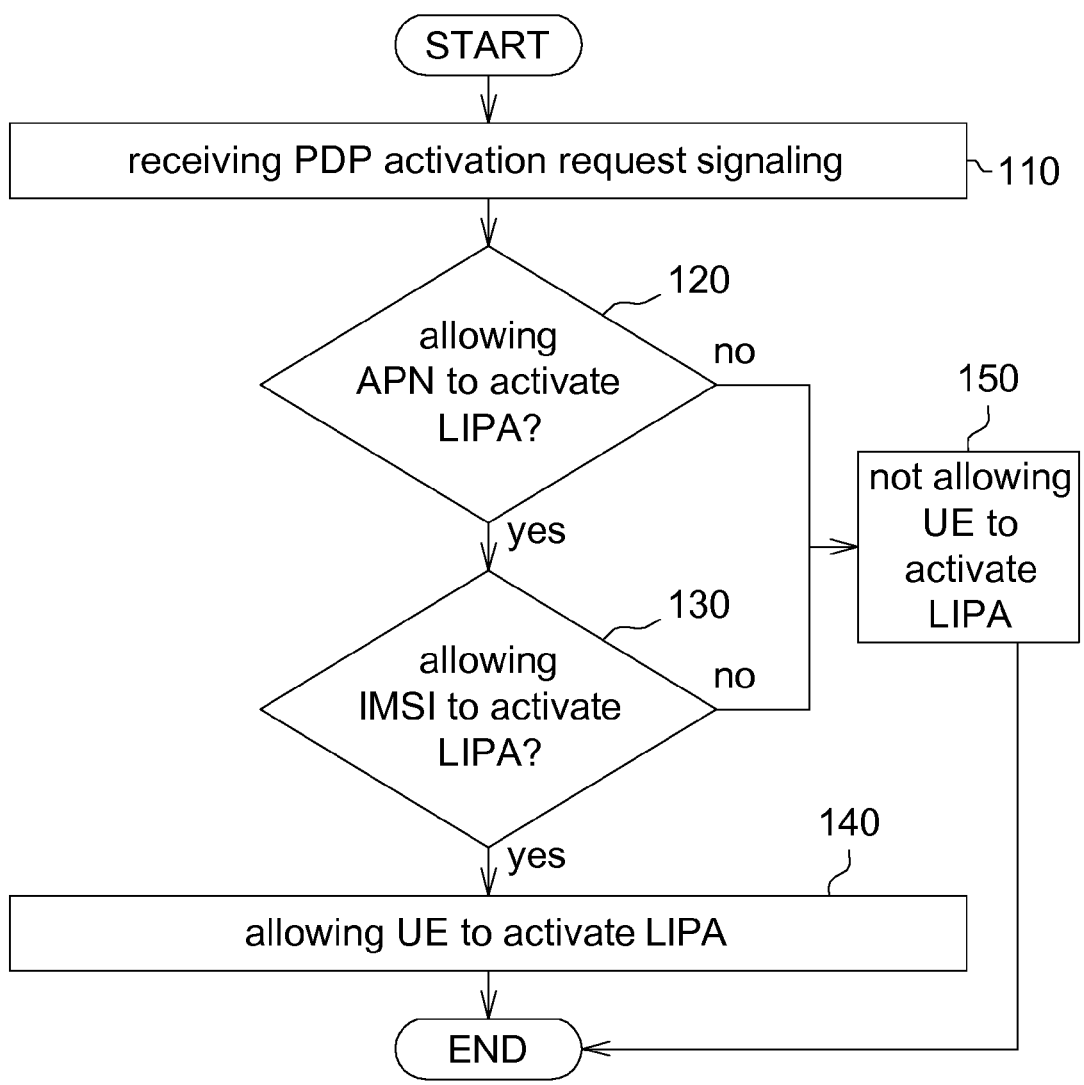
FIG. 1 shows a flowchart of checking by a base station whether an UE is allowed to activate LIPA function according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION OF THE DISCLOSURE

Local internet protocol access (LIPA), which enables a user equipment (UE) assigned with an Internet protocol (IP) address to be directly connected to an external network via a base station (for example, a home node B (HNB)) without passing through a core network (CN). So that, the network load of operators is relieved and operators have great interest in this.

In an embodiment of the disclosure, when the base station is booted or powered up, the base station obtains an LIPA disposition/check logic from an HNB management system (HMS). The LIPA disposition logic records details relating to the LIPA. The HMS is one of network elements of the operator. After the UE transmits a packet switch (PS) connection establish request (also referred as a packet data protocol (PDP) activation request signaling here below), that is, after the UE transmits an Internet request signaling, the base station checks whether to activate an LIPA function for the UE according to the LIPA disposition/check logic. If the UE is allowed to activate the LIPA function, after CN authentication, the base station determines whether the user plane data is allowed to be transmitted via the LIPA. If yes, then the base station allows the UE assigned with an IP address to access internet via the base station, and the base station, according to the LIPA disposition, determines whether a user plane data transmitted from the UE is connected to an external network directly without passing through the CN. When the base station determines that all data flow are allowed to be transmitted via the LIPA, the base station transmits data packets to the CN every one pre-determined time, to prevent the CN from disconnecting signaling even if the CN does not receive/transmit user plane data. In addition, the CN does not know whether the LIPA function is activated or not.

Referring to FIG. 1, a flowchart of checking by the base station whether the UE is allowed to activate the LIPA function according to the embodiment of the disclosure is shown. In step 110, the base station receives a packet data protocol (PDP) activation request signaling transmitted from the UE.

In step 120, according to the LIPA disposition logic obtained from the operators' HMS, the base station checks whether an access point name (APN) relating to the UE is allowed to activate the LIPA function. Here, the base station uses different IP address assignment modes according to the variety of APN. If the LIPA is to be activated, the base station assigns a private IP address to the UE. If the APN is allowed to activate the LIPA function, then the process proceeds to step 130. If the APN is not allowed to activate the LIPA function, then the process proceeds to step 150 which indicates that the UE is not allowed to activate the LIPA function.

In step 130, according to the LIPA disposition logic obtained from the operators' HMS, the base station checks whether an international mobile subscriber identity (IMSI) of the UE is allowed to activate the LIPA function. IMSI is a unique international identity number assigned to a mobile subscriber and is stored in a subscriber identity module (SIM) card. IMSI is used for identifying mobile subscribers. If the IMSI number is allowed to activate the LIPA function, then the process proceeds to step 140 which indicates that the UE is allowed to activate the LIPA function. If the IMSI number is not allowed to activate the LIPA function, then the process proceeds to step 150 which indicated that the UE is not allowed to activate the LIPA function.

In general, the operators may control which IMSI numbers are allowed to activate the LIPA function and which IMSI numbers are not to activate the LIPA function. Whether an IMSI number is allowed to activate the LIPA function is approved by the operator. If approved, then the UE is allowed to activate the LIPA function, and the UE may access internet via the base station. The base station determines whether Internet traffic (that is, user plane data transmitted from the UE) passes through the CN according to the LIPA disposition.

Figure 2:
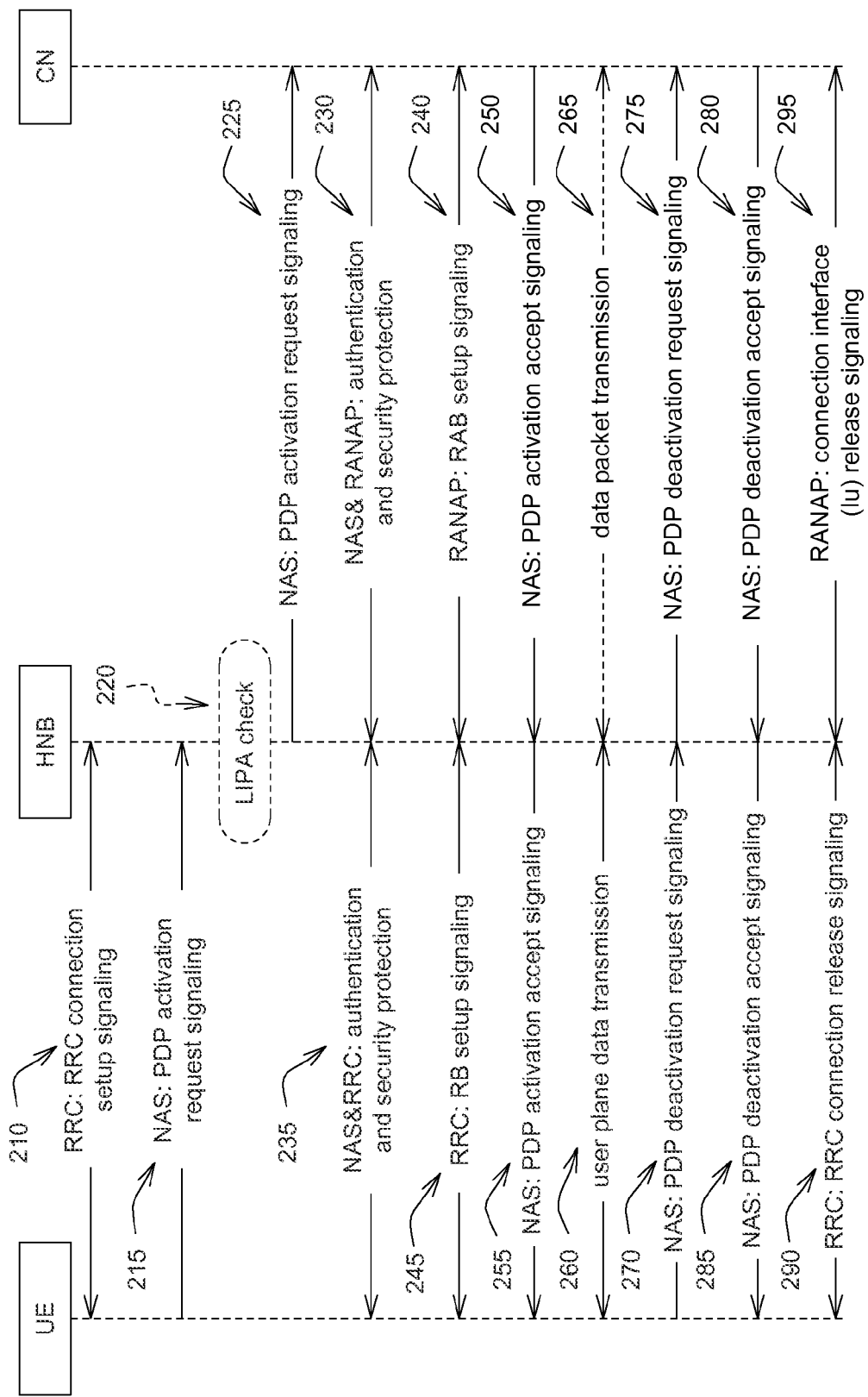
FIG. 2 shows a flowchart of a method for LIPA data flow according to the embodiment of the disclosure.

Referring to FIG. 2, a flowchart of a method for LIPA data flow according to the embodiment of the disclosure is shown. In step 210, a radio resource control (RRC) connection setup signaling is transmitted between the UE and the base station according to a RRC protocol. Thus, a signaling connection channel is established for transmitting signaling between the UE and the base station. After RRC connection is established, the UE exits an idle mode and enters into a connection mode for mobile network service.

In step 215, the UE transmits a PDP activation request signaling to the base station according to a non-access stratum (NAS) protocol. Transmission of PDP activation request signaling by the UE may be regarded as transmission of Internet request signaling to the base station. The NAS protocol is a protocol between the UE and the CN, and is used for controlling signaling between the UE and the CN.

In step 220, the base station performs LIPA check to determine whether the UE is allowed to activate the LIPA. Details of step 220 are disclosed in FIG. 1, and are not repeated here.

In step 225, the base station transmits a PDP activation request signaling (that is, Internet request signaling) to the CN according to the NAS protocol. The base station informs the CN that UE accesses internet via the LIPA. If the UE passes the LIPA check, then the base station transfers such information to the CN and the CN accordingly performs subsequent authentication.

In step 230, authentication and security protection are performed between the CN and the base station according to the NAS protocol and a radio access network application part (RANAP) protocol. In step 235, authentication and security protection are performed between the base station and the UE according to the NAS protocol and the RRC protocol. To put it in greater details, the CN performs authentication and security protection on the base station. If the base station passes the authentication performed by the CN, then the base station performs authentication and security protection on the UE. If the UE passes the authentication performed by the base station, then the base station reports this result to the CN. Step 230 and step 235 may be performed synchronic. Authentication process on the UE is performed by the CN.

In step 240, the CN and the base station transmit a radio access bearer (RAB) setup signaling to each other according to the RANAP protocol. The RANAP protocol is a control plane protocol between the base station and the CN. In order to control and bear the communication service for the users, the control plane handles control signaling such as for user phone call. The user plane handles user services such as packet division, packet combination and packet transfer.

In step 245, the UE and the base station transmit radio bearer (RB) setup signaling to each other according to the RRC protocol. Radio bearer selection refers to selection of wireless data service as a data channel. RB is established when there are messages to be transmitted between an external network and the UE. After RB is established, "bearer" is transmitted between the UE and the base station, and the Internet traffic from the UE is transmitted via the RB. That is, the base station, rather than the CN, transmits RB setup signaling to the UE.

In step 250, the CN transmits a PDP activation accept signaling to the base station according to the NAS protocol. In step 255, the base station transmits a PDP activation accept signaling to the UE according to the NAS protocol, and the base station assigns a private IP address to the UE. That is, the base station transmits an Internet request accept signaling to the UE according to the NAS protocol.

In step 260, data is transmitted between the base station and the UE. To put it in greater details, the base station receives user plane data from the UE via a "uu" interface. Here, "uu" interface refers to a wireless interface between the base station and the UE. The base station determines whether the user plane data is allowed to be transmitted via the LIPA. Details of step 260 are disclosed in FIG. 3 and its related disclosure.

Figure 3:
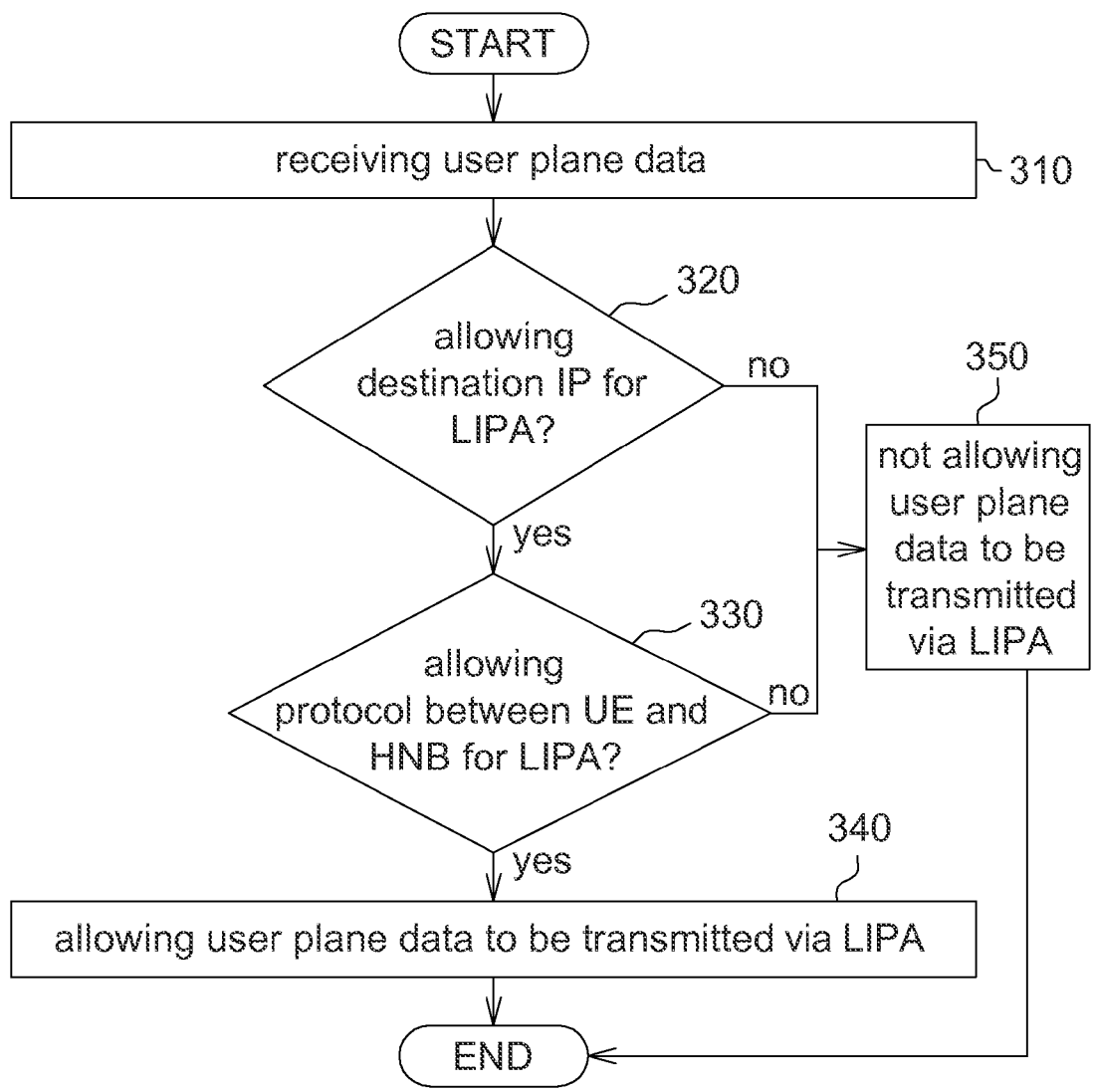
FIG. 3 shows a flowchart of checking by the base station whether user plane data is allowed to be transmitted via the LIPA.

Referring to FIG. 3, a flowchart of checking by the base station whether the user plane data is allowed to be transmitted via the LIPA in the embodiment is shown. In step 310, the base station receives the user plane data transmitted from the UE via uu such as the "uu" interface.

In step 320, the base station determines whether a destination IP of the user plane data is allowed to activate the LIPA function. The destination IP refers to a destination website IP that the user plane data is going to visit. If yes, then the process proceeds to step 330. If no, this implies that the user plane data is not allowed to be transmitted via the LIPA. The base station may contain one or more lists recording which destination IP addresses are allowed to activate the LIPA function (that is, the white list) and which destination IP addresses are not allowed to activate the LIPA function (that is, the black list).

In step 330, the base station determines whether a transmission protocol for user plane data between the UE and the base station is allowed for the LIPA function or not. Exemplarily but not restrictively, the transmission protocol for user plane data is: transmission control protocol/Internet protocol (TCP/IP), user datagram protocol (UDP), Internet control message protocol (ICMP), and so on. If yes, then the process proceeds to step 340, which indicates that the user plane data is allowed to be transmitted via the LIPA. If no, then the process proceeds to step 350 which indicates that the user plane data is not allowed to be transmitted via the LIPA. The base station may contain one or more list tables recording which protocols are allowed to activate the LIPA function (that is, the white list) and which protocols are not allowed to activate the LIPA function (that is, the black list).

Based on the flow in FIG. 3, the base station of the present embodiment of the disclosure determines whether the user plane data is allowed to be transmitted via the LIPA.

Again, referring to FIG. 2. In step 260, if the user plane data is allowed to be transmitted via the LIPA, then the UE performs data transmission/receiving by the private IP address assigned by the CN, and the base station performs network address translation (NAT) for translating the private IP address assigned to the UE into its own IP address, so that when the UE visits an external network, the external network feels like a visit by the base station.

In step 265, if the base station determines that all user plane data are transmitted via the LIPA (that is, all user plane data visit external networks via the base station without passing through the CN), the base station transmits data packets (but not the user plane data from the UE) to the CN every one a pre-determined time to avoid the CN disconnecting its signal link with the base station. That is because, in the prior art, if the CN does not receive any data packet from the base station for a long time, a signaling link between the CN and the base station is disconnected.

In step 270, the UE transmits a PDP deactivation request signaling to the base station according to the NAS protocol. That is, the UE informs the base station of an intended interruption of data link between the UE and the base station. The PDP deactivation request signaling may be regarded as a request signaling for the interruption of data link.

In step 275, the base station transmits the PDP deactivation request signaling to the CN according to the NAS protocol. That is, the base station informs the CN of an intended interruption of data link between the base station and CN. The PDP deactivation request may be regarded as a request signaling for the interruption of data link.

In step 280, in response to the PDP deactivation request signaling transmitted from the base station, the CN transmits a PDP deactivation accept signaling to the base station according to the NAS protocol. Then, data flow between the CN and the base station is interrupted, but signaling is still allowed to be transmitted between the CN and the base station. The PDP deactivation accept signaling may be regarded as a data link interruption accept signaling.

In step 285, after receiving the PDP deactivation request signaling transmitted from the CN, the base station transmits a PDP deactivation accept signaling to the UE according to the NAS protocol. Then, data flow between the UE and the base station is interrupted, but signaling is still allowed to be transmitted between the UE and the base station. The PDP deactivation accept signaling may be regarded as a data link interruption accept signaling.

In step 290, the UE and the base station transmits a RRC connection release signaling to each other according to the RRC protocol. Then, the signaling link between the UE and the base station is interrupted, so the signaling is not allowed to be transmitted between the UE and the base station. That is, the RRC connection release signaling may be regarded as a signaling link interruption signaling.

In step 295, the CN and the base station transmit a connection interface (Iu) release signaling to each other according to the RANAP protocol. The signaling link between the CN and the base station is interrupted, and signaling is not allowed to be transmitted between the CN and the base station.

In the embodiment of the disclosure, when the base station transmits a PDP activation accept signaling to the CN (as indicated in step 250), this may be regarded as the UE request for internet service, so the CN starts to measure an Internet service time provided to the UE. In step 275, when the base station transmits a PDP deactivation request signaling to the CN (as indicated in step 275), this may be regarded as the UE requests to interrupt Internet service, and the CN may finish measuring the Internet service time. Therefore, even all user plane data are allowed to be transmitted via the LIPA without passing through the CN, the CN still may measure the Internet service time provided to the UE.

Another embodiment of the disclosure discloses a transmission system for implementing LIPA. The transmission system includes a UE, a base station and a CN. Operations and functions of the UE, the base station and the CN are similar to the above disclosure and are not repeated here.

In the embodiment of the disclosure, after receiving the PDP activation request signaling from the UE, the base station checks whether the UE is allowed to activate the LIPA (as indicated in the flowchart of FIG. 1). If the UE is allowed to activate the LIPA, then the base station transfers such information to the CN which accordingly performs subsequent authentication. If the authentication is passed, then the UE may access internet via the base station, and the base station determines whether the Internet traffic (that is, the user plane data transmitted from the UE) passes through the CN according to the LIPA disposition. Thus, the network load of operators is reduced, and the CN still can measure the Internet service time provided to the UE.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for wireless data flow, comprising:
checking by a base station whether to activate a local Internet protocol access (LIPA) function for a user equipment (UE) after the user equipment transmits a packet data protocol (PDP) activation request signaling to the base station;
informing a core network (CN) by the base station for authentication and signaling control if the base station determines that the UE is allowed to activate the LIPA function;
if the base station allows a user plane data from the UE to be transmitted via the LIPA, assigning a private IP address by the base station to the UE for allowing the UE to access internet via the base station, the base station determining whether the user plane data transmitted from the UE passes through the CN or not;
measuring an Internet service time provided to the UE by the CN; and
periodically transmitting a data packet to the CN by the base station to maintain a signaling link between the base station and the CN if the base station allows all user plane data transmitted from the UE to be transmitted via the LIPA.

2. The method according to claim 1, wherein
the base station obtains an LIPA check logic from the CN after powering up; and
the base station checks whether to activate the LIPA function for the UE according to the LIPA check logic.

3. The method according to claim 2, wherein
after receiving the PDP activation request signaling from the UE, the base station checks whether an access point name and an international mobile subscriber identity (IMSI) are both allowed to activate the LIPA function; and
if yes, then the base station determines that the UE is allowed to activate the LIPA function.

4. The method according to claim 1, wherein
receiving the user plane data from the UE, the base station determines whether a destination IP of the user plane data and a protocol between the UE and the base station are both allowed for the LIPA; and
if yes, then the base station determines whether the user plane data is allowed to be transmitted via the LIPA.

5. A wireless data flow system, comprising:
a user equipment (UE), a base station and a core network (CN),
wherein,
the base station checks whether to activate a local Internet protocol access (LIPA) function for the UE after the UE transmits a packet data protocol (PDP) activation request signaling to the base station;
if the base station determines that the UE is allowed to activate the LIPA function, then the base station informs the CN for authentication and signaling control;
if the base station allows a user plane data from the UE to be transmitted via the LIPA, then the base station assigns a private IP address to the UE for allowing the UE to access internet via the base station, the base station determining whether the user plane data from the UE passes through the CN or not;
the CN measures an Internet service time provided to the UE; and
the base station periodically transmits a data packet to the CN to maintain a signaling link between the base station and the CN if the base station allows all user plane data transmitted from the UE to be transmitted via the LIPA.

6. The system according to claim 5, wherein
after powering up, the base station obtains an LIPA check logic from the CN; and
the base station checks whether to activate the LIPA function for the UE according to the LIPA check logic.

7. The system according to claim 6, wherein
after receiving the PDP activation signaling from the UE, the base station checks whether an access point name and a international mobile subscriber identity (IMSI) are both allowed to activate the LIPA function; and
if yes, then the base station determines that the UE is allowed to activate the LIPA function.

8. The system according to claim 5, wherein
after receiving the user plane data from the UE, the base station determines whether a destination IP of the user plane data and a protocol between the UE and the base station are both allowed for the LIPA; and
if yes, then the base station determines whether the user plane data is allowed to be transmitted via the LIPA.

* * * * *